Patented Mar. 20, 1928.

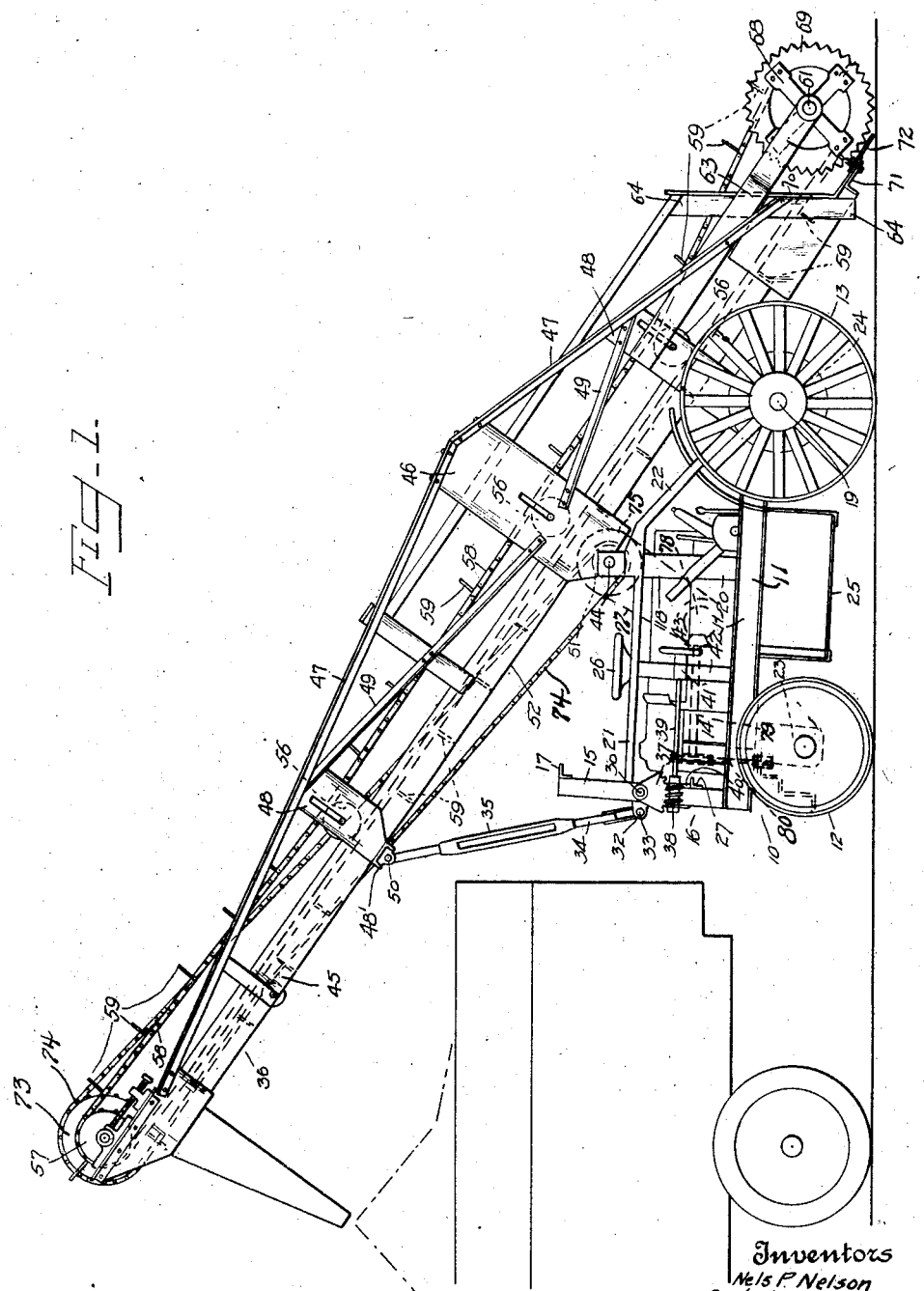

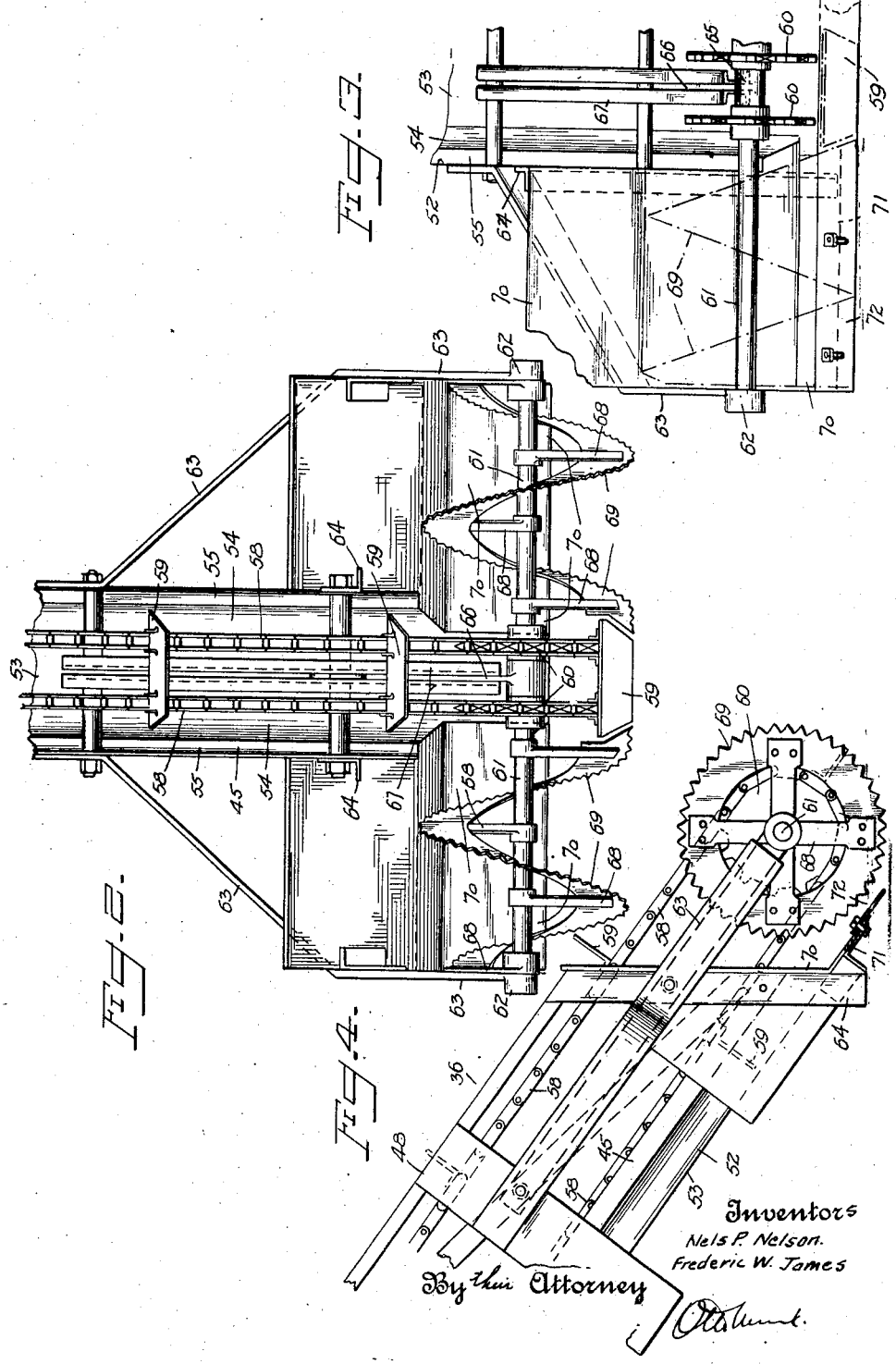

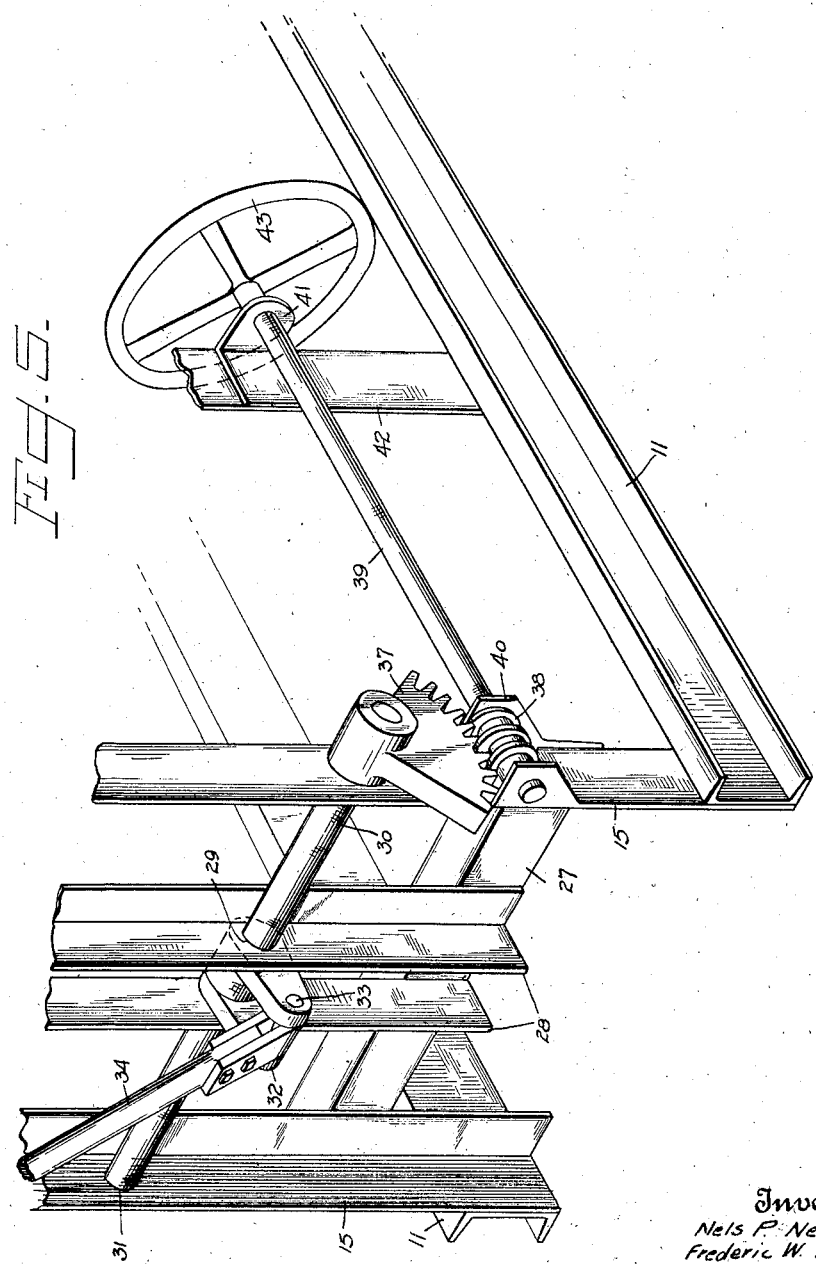

1,662,832

UNITED STATES PATENT OFFICE.

NELS P. NELSON AND FREDERIC W. JAMES, OF PASSAIC, NEW JERSEY, ASSIGNORS TO N. P. NELSON IRON WORKS INC., OF PASSAIC, NEW JERSEY, A CORPORATION OF NEW YORK.

WAGON-LOADING DEVICE FOR TRACTORS.

Application filed September 12, 1925. Serial No. 55,992.

This invention relates to wagon loading devices and has particular reference to a tractor attachment comprising a combined elevator, feeder and grader implement, especially adapted for breaking up and loading frozen snow, sand and gravel.

The present invention consists of a standard type of tractor provided with a chassis upon which a boom, carrying a double strand scraper conveyor, is adjustably mounted. A spiral feeder and a pair of shield plates are attached to the lower end of the boom, while adjacent the opposite end thereof, and controlled from the tractor chassis, is a grader implement which operates to adjust the inclination of the boom and consequently the elevation of the feeder and plates with respect to the ground or roadway upon which the loader is being operated.

It is the purpose of this invention to provide a loader attachment, for tractors, having a large loading capacity, means for feeding the loader, and means for regulating the feeding means to grade at any desired elevation. We accomplish this purpose by means of certain combinations and arrangements of parts hereinafter described in the specification and set forth in the appended claims.

One embodiment of our invention is illustratively exemplified in the accompanying drawings, in which:

Figure 1 is a side elevational view of our improved loading attachment; Figure 2 is a plan view of the lower end of the boom showing the feeder attachment and scraper conveyor; Figure 3 is a front elevational view of the same and Figure 4 is a longitudinal sectional view taken through the end of the boom and feeder. Figure 5 is a perspective view of the grader implement.

Referring to the drawings in detail, 10 denotes the tractor, preferably a Fordson tractor, having a rectangular chassis or frame 11, supported upon the front and rear wheels 12 and 13, and a power plant 14.

The chassis 11 is made up of a frame composed of channel irons, one thereof arranged longitudinally at each side of the tractor. At the front of the frame and secured to the ends of the channel irons are the uprights 15 of a standing frame support 16, the upper ends of the uprights 15 being attached to an overhead angle bar 17, upon which the loading boom is supported when in transporting position. The rearward end of the chassis 11 is provided with an upright standard 18 arranged well forward of the rear wheel axle 19 and comprising parallel uprights 20 connected adjacent their upper ends to forwardly projecting bars 21 which are connected to the front uprights 15. The rearward frame is supported in upright position by means of parallel inclined irons 22 connected at opposite ends to the uprights 20 and extreme rearward ends of the channel irons of the chassis. Suitable front and rear axle connections 23 and 24 are provided to receive and embrace the axles of the tractor wheels 12 and 13. A driver's platform 25 is suspended from the left side of the chassis so as to enable the operator to control the device from the steering wheel 26 and at the same time give him ample opportunity to watch and control the loading operations of his machine.

The front frame 16 is additionally provided with a transverse angle bearing 27 secured at its ends to the upright pieces 15 at an elevation substantially above the plane of the channel irons, the horizontal flange of the bar being disposed rearwardly so as to bring the vertical flange against the uprights. The bearing 27 and cross beam 17 support at their mid-portions two upright parallel angle pieces 28, which are spaced slightly apart, and which midway of their length are provided with openings or bearings 29 to receive a crank shaft 30, the outer ends thereof projecting through openings or bearings 31 in the uprights 15. A suitable crank arm 32 is secured to the shaft 30 between the flanges of the angle pieces 28. The free end of the crank arm 32 is provided with a crank pin 33 to receive one end of a link 34 which is provided with a turn buckle 35 midway of its length, and which at its extreme upper end is pivotally connected to the under side of the boom 36. The relative position of the crank arm 32 and consequently the inclination of the boom, as hereinafter described, depends upon adjustment of the shaft 30. Such adjustment necessarily being rotary, is effected by a segment worm gear 37 fixed to the projecting end of the shaft 30 and meshing with a worm 38 carried by a shaft 39 which extends longitudinally of the chassis and which is mounted in a forward bearing plate 40 at one end, and in an angular plate 41 projecting from the upper end of an upright piece 42 at the other end. A hand wheel 43 carried by the end of the shaft 39 is located within easy reach of the operator who stands on the platform 25.

Disposed transversely of the tractor and carried between the free ends of the rearward frame 18 is a pivot bar 44 upon which the boom 36 is supported and about which it is adjustable to operating and transporting positions.

The boom 36 comprises a truss structure having straight longitudinal side frame bars 45, upright side plates 46 disposed substantially rearwardly on the bars 45, and inclined members 47 projecting from the upper ends of the plates 46 to the outer ends of the frame bars 45. Intermediate uprights 48 are arranged along the boom to strengthen the structure, and additional inclined side supporting bars 49 project from the base of the plates 46 upwardly to the upper elevation of the intermediate uprights 48. The forward intermediate uprights 48 on each side of the elevator frame carry a cross bar 48′ which is provided with a pin 50 to receive the upper end of the turn buckle connection 35. The upright side plates 46 are provided at their lower ends with saddles 51 which receive and bear upon the opposite ends of the pivot 44 of the chassis 11.

Hereinafter, the end of the boom 36 overlying the front portion of the tractor will be termed the discharge end while the opposite end will be referred to as the feed end. Projecting from one end of the boom 36 to the other is a trough 52 having a bottom wall 53 and inclined side walls 54. The walls 54 are bent at their upper edges to provide flanges 55, which are supported on the longitudinally projecting angle bars 45 forming part of the boom structure. Between the members of each pair of uprights 48 and side plates 46 is arranged an idler flanged roller 56, each thereof being automatically adjustable in a vertical direction in suitable slots disposed in the plates 46 and 48. A pair of sprockets 57 are adjustably mounted on the discharge end of the boom 36, and continuous conveyor chains 58 are supported at the discharge end on these sprockets, the intermediate portions of the chains being supported on the rollers 56. A plurality of spaced flights 59 are carried by the chains 58, so as to bring the lower portion thereof beneath the rollers, and the flights in contact with the walls of the trough 52. Motion is imparted to the sprockets 57 and the conveyor chains 58 by a sprocket 73 and chain 74, which are driven from a double sprocket 75 loosely mounted on the pivot 44. This double sprocket is connected by chain drive 77 to a pair of bevel gears 78 actuated by a power shaft 79 disposed longitudinally at one side of the tractor, the whole being driven by sprockets and chain 80 from the engine crankshaft of the tractor.

In order to insure perfect operation of the parts at the feed end of the boom, we provide a rigid construction comprising a pair of sprockets 60 mounted on and rotating with a foot shaft 61 which is rotatably mounted in bearings 62 carried at the ends of fixed arms 63. The arms 63 are designed and disposed so that the pickup or cutting surface of the feed is uninterrupted across the entire advanced end of the boom. According to this arrangement the outside arms 63 are Z-shaped, the inner portions of which are attached to the plates 48, the intermediate portions of the arms being inclined forwardly, outwardly and away from the boom to points which mark the outside dimensions of the feeding attachment. The extreme outer ends of the arms 63, being disposed parallel to the axis of the boom, as shown in Figure 2, carry the bearings 62. The arms 63 are additionally supported by angle bars 64 which form the lower or feed end of the boom and which are disposed at an inclination to both the plates 48 and side bars 45, the angle of the bars 64 with respect to the axis of the boom such that when the boom is adjusted to ordinary operating position, the said bars will then be in substantially upright position with respect to the ground. In addition to the outside bearing arms 63 the midportion of the foot shaft 61 is provided with a bearing 65 carried by an arm 66 which receives its rigid support between two flanges of adjacent longitudinally disposed bars 67 fixed in the truss frame midway of its width.

In feeders of this general sort, whether of continuous spirals or of separate paddles, irrespective of their direction of rotation, the foot shaft has been hitherto carried in two bearings located approximately in the planes of the side frames of the boom and having the foot sprockets with buckets or flights between them and the feeders outside them. Of necessity clearances must be left between the rotating feeders and the frames supporting the bearings, and again between these frames and the flights or buckets; so that in these feeders a space is left generally from six to twelve inches wide between the buckets and feeders in which the bank is cut by neither. Instead, in granular stuffs such as are usually handled by loaders, material lying in these spaces forms ridges which are partly pushed in towards the buckets by the advancing mass of material coming in from the feeders and partly trimmed off by scrapers attached to the loader. While this action may be adequate in loose materials, the ridges left when trying to dig hard or caked substances are most objectionable, as the scrapers will not break them down and they either raise the whole feeder end or stop the advance of the loader. This is particularly true when moving snow, as its lowermost layers turn quickly to ice; and the ridges frozen fast to the ground form obstacles which partly from their hardness and partly from ice-impaired traction, the scrapers cannot remove.

In the present invention, throughout the length of the conveyor chains 58, the flights 59 are equally spaced (in this case seven links apart), and the circumference of the sprockets 57 is an integral multiple of the flight spacing (in this case 21 teeth), so that the flights always fall at predetermined points on these sprockets and their relation to the spiral plates is always the same. The motions of the feeder and flights being thus synchronized, the spiral plates of the feeder can be extended into the spaces between the flights or buckets without interference, and the cut of the spirals thus lapping the cut of the flights will give an uninterrupted feed across the entire width of the loader, and will remove the ridges above referred to which prevent the successful operation of earlier constructions.

The conveyor chains 58, which are supported at the discharge end of the boom on the sprockets 57, are similarly supported at their other or feed ends over sprockets 60 mounted on the foot shaft 61 on each side of the central bearing 65. The projecting flanges of the flights 59 are preferably trapezoidal in shape, the shorter parallel side being disposed away from the chains 58 and of sufficient length to span the outside dimensions of the two sprockets 60. Between the bearings 62 and 65 on each side of the center and mounted to rotate with the foot shaft 61 is a spiral feeder 69, the inner end of which adjacent the path traversed by the inclined side of the flights 59 is cut off at an angle so as to just clear the ends of the flights when the latter travel over the sprockets. The outer ends of the spirals are projected to points just short of the arms 63 and the spiral feeders themselves are supported on the shaft 61 by means of radially arranged arms 68. It will be clear then, that from one end of one of the spiral feeders 69 to the opposite end of the other feeder, including the scraper edge of the flights 59, there is an uninterrupted scraping and cutting edge.

A trough is fixed just rearwardly of spiral feeders, comprising two angular plates 70 one thereof being arranged on each side of the conveyor trough and having their upright longer flanges attached to the bars 64 and 67 and arms 63 as illustrated in Figure 2. The shorter flanges of the plates 70 are disposed parallel to the longitudinal axis of the boom and are supported on angle pieces 71 projecting from the lower end of each bar 64. In order to regulate the height of the scraping edge of the trough plate 70, the shorter flanges of the plates 70 and angle bars 71, carry adjustable edge members or bars 72, as illustrated in Figure 4. The bars 72 which may be adjusted so as to be either above, level with, or below the plane of the floor cut by the spirals and flights, according to the nature of the material being handled, are virtually the scraping and grading elements of the implement, whereby adjustment of the grader attachment in one direction or another will raise or lower the relative position of the bars 72 with respect to the ground.

Particular advantages of the present loader make it possible to back the apparatus into a pile of frozen material and because of the direction of movement of the spiral feeders 69 and flights 59, the material is practically ground away the full width of the feeding end before reaching the scraper and gathered into the trough 52 and pushed upwardly to the discharge end thereof. Operation of the grader control will adjust the relative position of the feeder trough 70 with respect to the ground and consequently determine the depth of material to be affected by the spiral feeders and scraper flights.

In the operation of the feeder in the same direction as the traction of the tractor, the resistance the material offers to the turning of the feeder is turned to account in providing additional traction. This is most necessary in icy conditions where the traction is impaired, for where the elevator operates in the contrary direction, opposing the resistance of the feeder to the tractive effort, headway against ice and snow is practically impossible.

The success in the operation of the present invention is due to the combination of these several elements,—the feeder which cuts evenly across its entire width in advance of the scraper or transverse trough, its operation in the same direction as the traction of the tractor in conjunction with the scraper conveyor carrying on its lower strand, and the rigid boom the position of which is regulated by the grader attachment.

What we claim and desire to secure by Letters Patent is:

1. In a loading attachment of the character described, the combination with power means, of traction means driven by said power means, a frame supported on said traction means, a boom pivotally carried by the frame, said boom comprising a longitudinally arranged trough and a rigid scraper portion projecting beyond the end of said trough, a scraper conveyor having its lower strand operating in the trough and scraping the ground in advance of the said rigid scraper, and means for operating the conveyor from the power means.

2. In a loading attachment of the character described, the combination with power means, of traction means driven by said power means, a frame supported on said traction means, a boom pivotally carried by the frame, means for adjusting the inclination of the boom, said boom comprising a longitudinally arranged trough and a rigid scraper portion projecting beyond the end of said trough, a scraper conveyor having its lower strand operating in the trough and scraping the ground in advance of the said rigid scraper when the means for adjusting the inclination of the boom is adjusted, and means for operating the conveyor from the power means.

3. In a loading attachment of the character described, the combination with power means, of traction means driven by said power means, a frame supported on said traction means, a boom pivotally carried longitudinally of the frame, means disposed adjacent the delivery end of the boom and the frame for regulating the inclination of the boom, said boom comprising a longitudinally arranged trough and a rigid scraper portion projecting beyond the ground end of the trough, a scraper conveyor having its lower strand operating in the trough and scraping the ground in advance of the said rigid scraper when the means for adjusting the inclination of the boom is adjusted, and means for operating the conveyor from the power means.

4. In a loading attachment of the character described, the combination with power means, of traction means driven by said power means, a frame supported on said traction means, a boom pivotally supported on said frame, said boom comprising a longitudinally arranged trough and a rigid scraper portion projecting beyond the end of said trough, a scraper conveyor having its lower strand running in the trough and being supported at its ground end above the rigid scraper portion to scrape the ground in advance of the said rigid scraper portion, a transverse spiral feeder operated by the ground end of the conveyor, and means for operating the conveyor from said power means.

5. In a loading device of the character described, the combination with power means, of traction means driven from the said power means, a frame supported on said traction means, a boom pivotally supported intermediate its ends on said frame, said boom comprising a longitudinally arranged trough and a rigid scraper portion projecting beyond the end of said trough, a scraper conveyor operating with the lower strand, moving in said trough and scraping the ground in advance of the rigid scraper portion, and means for operating the conveyor from said power means.

6. In a loading device of the character described, the combination with power means, of traction means driven from the said power means, a frame supported on said traction means, a boom pivotally supported on said frame, said boom comprising a longitudinally arranged trough and a rigid scraper portion projecting forward of the end of said trough, a scraper conveyor therefor having its lower strand operating in the trough and scraping the ground in advance of the said rigid scraper, and means cooperating with said power means for driving said scraper conveyor from the pivotal point of the boom.

7. In a loading device of the character described, the combination with a tractor having a frame, a boom pivotally mounted substantially intermediate its ends in said frame and comprising a trough longitudinally disposed therein and a rigid scraper projecting beyond the end of the trough, and a scraper conveyor running with its lower strand in the trough and the ground end scraping the ground in advance of the rigid scraper.

8. In a loading device of the character described, the combination with a tractor having a frame, a boom pivotally mounted substantially intermediate its ends in said frame and comprising a trough longitudinally disposed in the boom, and a rigid scraper projecting forward of the ground end of the trough, a scraper conveyor running with its lower strand in the trough and scraping the ground in advance of the ground end of the trough, and means between the frame and the delivery end of the boom for adjusting the inclination thereof.

9. In a loading device of the character described, the combination with a tractor having a frame, a boom pivotally mounted substantially midway its length in the frame and comprising a trough longitudinally disposed therein and a rigid scraper portion projecting forward of the ground end of the trough, and a scraper conveyor rigidly supported and operating with its lower strand in the trough and making contact with the ground beyond the rigid scraper.

10. In a loading device of the character described, the combination of a tractor, a boom pivotally mounted substantially midway of its length on said tractor, a trough longitudinally disposed in said boom and terminating at the ground end on a rigid scraper member, and a scraper conveyor running with its lower strand in the trough and making contact with the ground forward of the rigid scraper end of the trough.

11. In a loading device of the character described, the combination with a tractor, of a boom pivotally mounted on said tractor, a trough longitudinally disposed in said boom and having a rigid scraper projecting forward of the ground end of the trough, a scraper conveyor carrying in the trough and scraping the ground in advance of the rigid scraper, and a transverse spiral feeder at the foot of the conveyor.

12. In a loading device of the character described, the combination with a tractor, of a boom pivotally mounted on said tractor, a trough longitudinally disposed in said boom and a rigid scraper portion projecting forward of the ground end of the trough, a scraper conveyor running with its lower strand in the trough and scraping the ground in advance of the rigid scraper portion, a transverse spiral feeder at the foot of said conveyor and a foot shaft for supporting the conveyor and feeder.

13. In a loading device of the character described, the combination with a tractor, of a boom pivotally mounted on said tractor, a trough longitudinally disposed in said boom, and a rigid scraper portion projecting forward of the ground end of the trough, a scraper conveyor running with its lower strand in the trough and scraping the ground in advance of the rigid scraper, a transverse trough at the ground end of the first trough and superimposed over the rigid scraper, the said transverse trough being provided with an opening communicating with the first trough, and a transverse spiral feeder operating in said transverse trough and scraping the ground in advance thereof.

14. In a loading device of the character described, the combination with a tractor, of a boom pivotally mounted in said tractor, a trough longitudinally disposed in said boom and a rigid scraper portion projecting in advance of the trough, a scraper conveyor operating with its lower strand in the trough and scraping the ground in advance of the rigid scraper portion, an adjustable plate for the edge of the rigid scraper portion, and a transverse spiral feeder disposed to scrape the ground in advance of the adjustable plate and feed the material into the path of the scraper conveyor.

15. In a loading device of the character described, the combination of a conveyor consisting of a pair of chains having material-carrying members attached at equal distances, a pair of foot sprockets receiving said chains, an extended foot shaft driven by said chains carrying a feeder of spirally disposed members arranged to feed material to said conveyor, the cutting edges of said spiral members extending within the paths of the ends of the material-carrying members, substantially as described.

16. In a loading device of the character described, the combination of a conveyor having material-carrying members attached at equal distances and an extended foot shaft carrying spirally arranged feeding members extending within the paths of the ends of the material-carrying members and synchronized therewith, substantially as described.

17. In a loading device of the character described, the combination with a tractor of a boom pivotally mounted on said tractor, a trough longitudinally disposed in said boom, a scraper conveyor running in said trough, a transverse trough at the foot of said first named trough having an opening communicating therewith, an adjustable scraper carried by said transverse trough, and a transverse spiral feeder operating in said transverse trough.

18. In a loading device of the character described, the combination with a tractor of a boom pivotally mounted on said tractor, a trough longitudinally disposed in said boom, a scraper conveyor running in said trough, a transverse trough at the foot of said first named trough having an opening communicating therewith, a scraper blade adjustably mounted at one edge of said transverse trough, and a transverse spiral feeder operating in said transverse trough, said scraper blade being adjustable with respect to the tangent point of the spiral feeder and the ground.

In testimony whereof we affix our signatures.

NELS P. NELSON.
FREDERIC W. JAMES.